United States Patent [19]

Haze

[11] Patent Number: 4,642,788
[45] Date of Patent: Feb. 10, 1987

[54] COMBINATORIAL WEIGHING METHOD AND APPARATUS

[75] Inventor: Setsuo Haze, Shiga, Japan

[73] Assignee: Kabushiki Kaisha Ishida Koki Seisakusho, Kyoto, Japan

[21] Appl. No.: 605,377

[22] Filed: Apr. 27, 1984

[30] Foreign Application Priority Data

Apr. 27, 1983 [JP] Japan .................. 58-074830

[51] Int. Cl.⁴ .................. G01G 19/22; G01G 19/00
[52] U.S. Cl. .................. 364/567; 177/25; 177/50; 177/59
[58] Field of Search .................. 364/567, 555, 478; 177/1, 25, 26, 35, 56, 70, 50, DIG. 12

[56] References Cited

U.S. PATENT DOCUMENTS

| | | | |
|---|---|---|---|
| 3,724,569 | 4/1973 | Blodgett | 177/1 |
| 3,805,903 | 4/1974 | Muskat et al. | 177/50 |
| 4,418,771 | 12/1983 | Henry et al. | 364/567 X |
| 4,441,567 | 4/1984 | Hirano | 364/567 X |
| 4,508,186 | 4/1985 | Sashiki et al. | 177/1 |

FOREIGN PATENT DOCUMENTS 2089153 of 0000 United Kingdom .

Primary Examiner—Errol A. Krass
Assistant Examiner—Thomas G. Black
Attorney, Agent, or Firm—Staas & Halsey

[57] ABSTRACT

A combinatorial weighing method and apparatus wherein a value serving as a target for a combinatorial computation is set so that the mean weight value of batches of articles weighed out selectively by plural weighing cycles becomes equal to a preset weight value within preset allowable limits. Combinatorial computations are performed while diminishing the target weight value by a predetermined amount when the mean weight value is greater than the preset weight value, and increasing the target weight value by a predetermined amount when the mean weight value is less than the preset weight value.

20 Claims, 6 Drawing Figures

COMBINATORIAL WEIGHING METHOD AND APPARATUS

CROSS REFERENCE TO RELATED APPLICATION

This application is related to U.S. application Ser. No. 590,356 filed Mar. 16, 1984, now U.S. Pat. No. 4,512,427, and assigned to the assignee of the subject application.

BACKGROUND OF THE INVENTION

This invention relates to a combinatorial weighing method and apparatus in an automatic weighing system of the combinatorial type. More particularly, the invention relates to a combinatorial weighing method and apparatus for measuring the weight of a batch of articles introduced into each of a plurality of weighing machines, forming the weight values provided by the weighing machines into combinations, selecting the combination of weighing machines whose articles have a total combined weight within a preset allowable range, and discharging the articles from the selected combination of weighing machines.

According to a combinatorial weighing apparatus which is known in the art, combinatorial weighing is carried out by weighing batches of articles which have been introduced into a plurality of weighing machines, forming combinations of the weight values from the weighing machines, obtaining a combination (referred to as the "optimum combination") the total weight of which is equal to a preset weight value or closest to the preset weight value within preset allowable limits, discharging the articles from the machines belonging to the combination obtained, subsequently replenishing the weighing machines, which have discharged their articles, with articles in order to prepare for the next combination, and continuing automatic weighing by repeating the foregoing operations.

In a combinatorial weighing apparatus of the foregoing type, a combinatorial weighing technique customarily employed is referred to as a so-called "minus-cut method" wherein the lower limit value of the preset allowable limits is so determined as to be equal to the preset weight value. The reason is that setting the lower limit value to one below the preset weight value can have the undesirable result of providing a batch of discharged articles the total weight of which is too low. With the minus-cut method, a mean weight value $W_m$ obtained over a plurality of weighing cycles always falls within a range between a preset weight value $W_s$ and an upper limit weight value $W_{max}$, as shown in FIG. 1. Therefore, as a result of adopting the minus-cut method, the total weight of the combination obtained in every weighing cycle must be made greater than the preset weight value. This is a disadvantage in that it results in a lower yield on the producer's, or seller's, side.

Accordingly, in some countries it is legally permitted to adopt a lower limit value $W_{min}$, namely the lower limit of the aforementioned preset allowable limits, which is below the preset value $W_s$. In other words, if the total weight of a combination resides within the limits of a predetermined precentage (e.g., 4.5%) about a central value which is the preset weight value, then shipment of the product is allowed even if the total weight of the combination is below the preset weight value. For consumer protection, however, the producer is obligated to adopt a mean weight value $W_m$ for shipment which is greater than the preset weight value $W_s$, as shown in FIG. 2.

SUMMARY OF THE INVENTION

An object of the present invention is to provide a combinatorial weighing method and apparatus through which the mean weight value of the total weight of a discharged combination of articles can be kept greater than a preset weight value even if the lower limit value of the preset allowable limits is below the preset weight value.

Another object of the present invention is to provide a combinatorial weighing method and apparatus through which the mean weight value of the total weight of a discharged combination of articles can be brought extremely close to a preset weight value.

According to the present invention, the foregoing objects are attained by providing a combinatorial weighing method, and an apparatus for practicing the method, in which there is provided a control unit adapted to perform combinatorial computations based on weight values produced as outputs by respective ones of a plurality of weighing machines which measure the weights of articles supplied thereto, to select a combination of weighing machines whose articles have a total combined weight value within preset allowable limits, and to discharge the articles from the weighing machines belonging to the selected combination. The method comprises the steps of calculating a mean weight value of total combined weight values selected by a plurality of weighing cycles, setting a target weight value, which serves as the target of a combinatorial computation, in such a manner that the mean weight value approaches a preset weight value which is within the preset limits, and performing combinatorial computation while diminishing the target weight value by a predetermined amount when the mean weight value is greater than the preset weight value, and increasing the target weight value by a predetermined amount when the mean weight value is less than the preset weight value.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Reference will now be had to the drawings to describe an embodiment of the present invention in detail.

Figure 3:
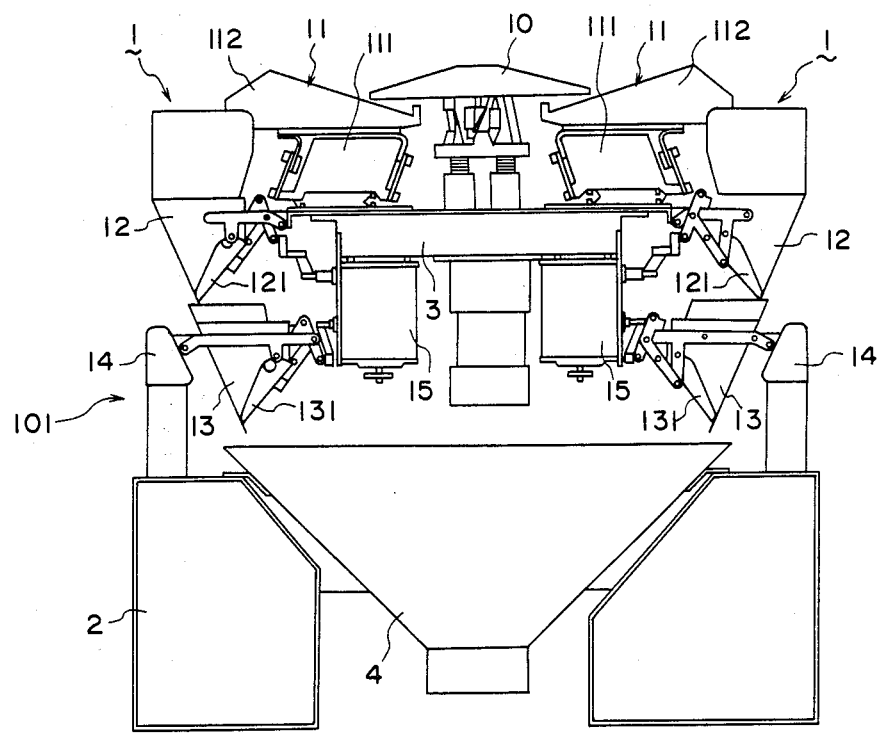
FIG. 3 is a simplified side view of the overall construction of an embodiment of a combinatorial weighing apparatus for practicing the method of the present invention.

Illustrated in FIG. 3 is an example of a combinatorial weighing apparatus for practicing the combinatorial weighing method of the present invention. Numeral 10 denotes a dispersing table of vibratory conveyance-type, supported by a platform 3 disposed above the central portion of a base 2. Articles to be weighed are introduced onto the dispersing table 10 from chutes of a supply conveyor (not shown) and are imparted with vibratory motion for a predetermined length of time so as to be dispersed radially outward from the center of the table. Numerals 1, . . . 1 denote n-number of weighing stations which are arranged around the dispersing table 10 along radially extending lines to receive the articles dispersed by the table. Each weighing station 1 includes a dispersing feeder 11, a pool hopper 12, a weighing machine 101 comprising a weighing hopper 13 and a weight sensor 14, and a hopper drive unit 15 for opening and closing a hopper gate 121 of the pool hopper 13 and a hopper gate 131 of the weighing hopper 13.

The dispersing feeders 11 are arranged radially so as to surround the dispersing table 10, and each includes an electromagnetic vibrator 111 and a trough 112 supported by the platform 3. Articles supplied to the trough 112 from the dispersing table 10 fall into the corresponding pool hopper 12 from the end of the trough due to the linear reciprocating motion of the electromagnet 111. The pool hopper gate 121 is opened under the control of the hopper drive unit 15, whereupon the articles contained in the pool hopper 12 are released into the corresponding weighing hopper 13 constituting the weighing machine 101. Each of the weight sensors 14 attached to a respective one of the weighing hoppers 13 is operable to measure the weight of the articles introduced into the corresponding weighing hopper, and to apply an electrical signal indicative of the measured weight to a combinatorial control unit, described below. The combinatorial control unit then obtains an optimum combination by performing processing for combinatorial weighing based on the weight values obtained from the weighing machines 101, and produces a discharge control command which is applied to the hopper drive units corresponding to the optimum combination. The hopper drive units 15 respond to the command by opening the hopper gates 131 on the weighing hoppers 12 of the corresponding weighing machines 101, whereby the articles contained in these weighing hoppers 13 are discharged.

Designated at numeral 4 is a collecting chute disposed below the weighing hoppers 13 for collecting the articles released from the weighing hoppers 13 and for supplying these articles to a packaging machine, (not shown).

Figure 4:
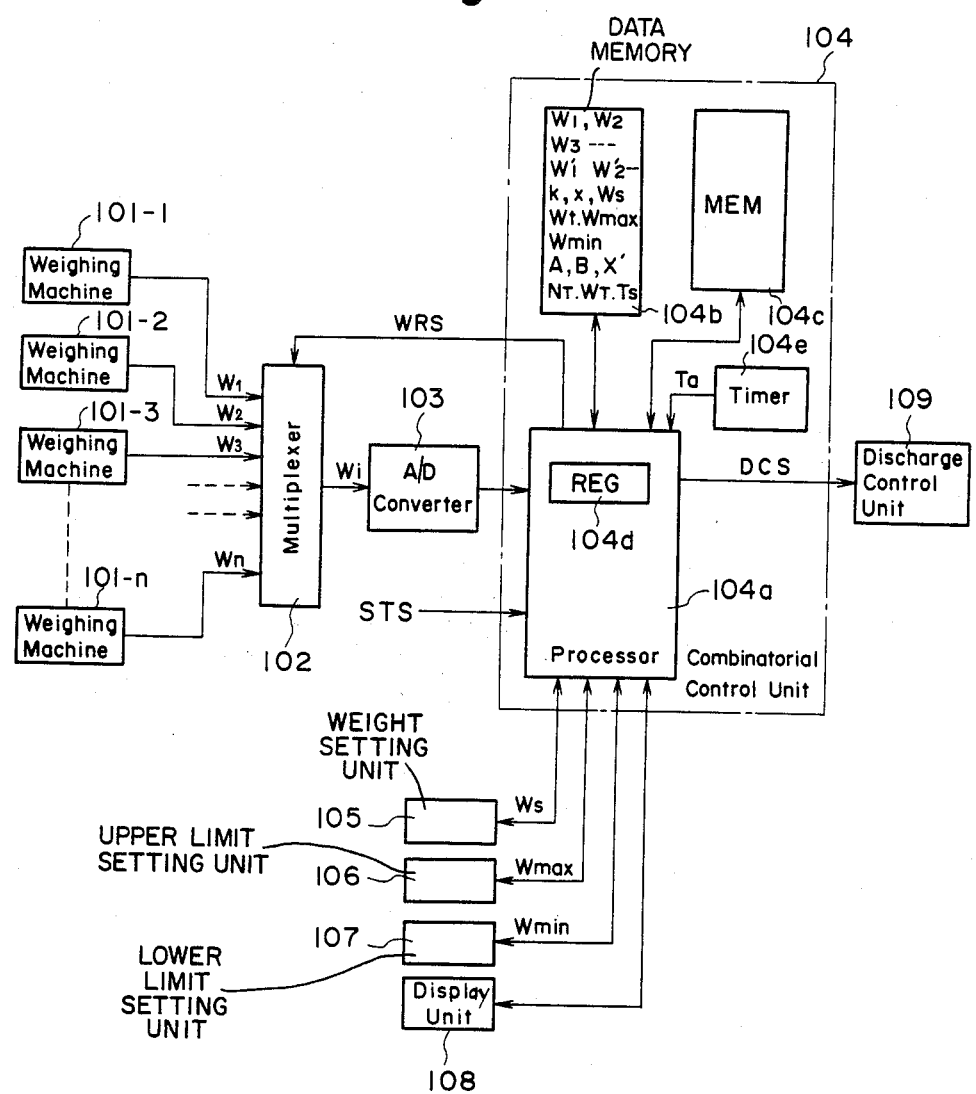
FIG. 4 is a block diagram of a combinatorial control unit for implementing the present invention.

A block diagram of a weighing apparatus for practicing the combinatorial weighing method of the present invention is illustrated in FIG. 4.

Figure 1:
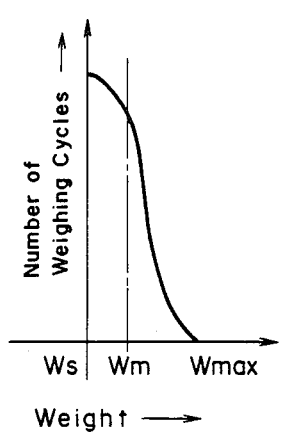
FIG. 1 is graph of a range of mean weight values obtained when combinatorial weighing is performed in accordance with the conventional minus-cut method.
Figure 2:
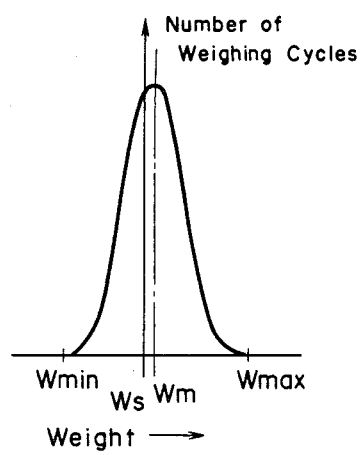
FIG. 2 is graph of a range of mean weight values obtained according to the combinatorial weighing method and apparatus of the present invention.

In FIG. 4, weight values Wi (i=1, 2, . . . n) produced by n-number of the aforementioned weighing machines 101-1, 101-2 . . . 101-n, are applied to a multiplexer 102, constituted by, e.g., an analog switch, which delivers the weight values in sequential fashion in response to a weight read signal WRS from a combinatorial control unit 104. An analog-to-digital (A/D) converter 103 converts each analog weight value Wi, delivered by the multiplexer 102, into a digital value. The digital output of the A/D converter 103 is applied to the combinatorial control unit 104, which has the construction of a microcomputer. The latter includes a processor 104a which receives the output of the A/D converter 103 for executing processing in accordance with a combinatorial processing program, a data memory 104b comprising a RAM (random-access memory), a memory 104c storing the combinatorial processing program, and a timer 104e. A weight setting unit 105 sets a preset weight value $W_s$, which is applied to the processor 104a. Numeral 106 denotes an upper limit setting unit, and 107 a lower limit setting unit. The units 106, 107 are for establishing preset allowable limits (an upper limit value $W_{max}$ and a lower limit value $W_{min}$) for the total weight value of a combination. It should be noted that the upper limit value $W_{max}$, lower limit value $W_{min}$ and preset weight value $W_s$ are related by the inequality $W_{min} < W_s < W_{max}$, as shown by FIG. 2. Numeral 108 denotes a display unit for displaying the total weight of a combination, the weighing machines selected, improper weights, etc. Numeral 109 denotes a discharge control unit.

Figure 5:
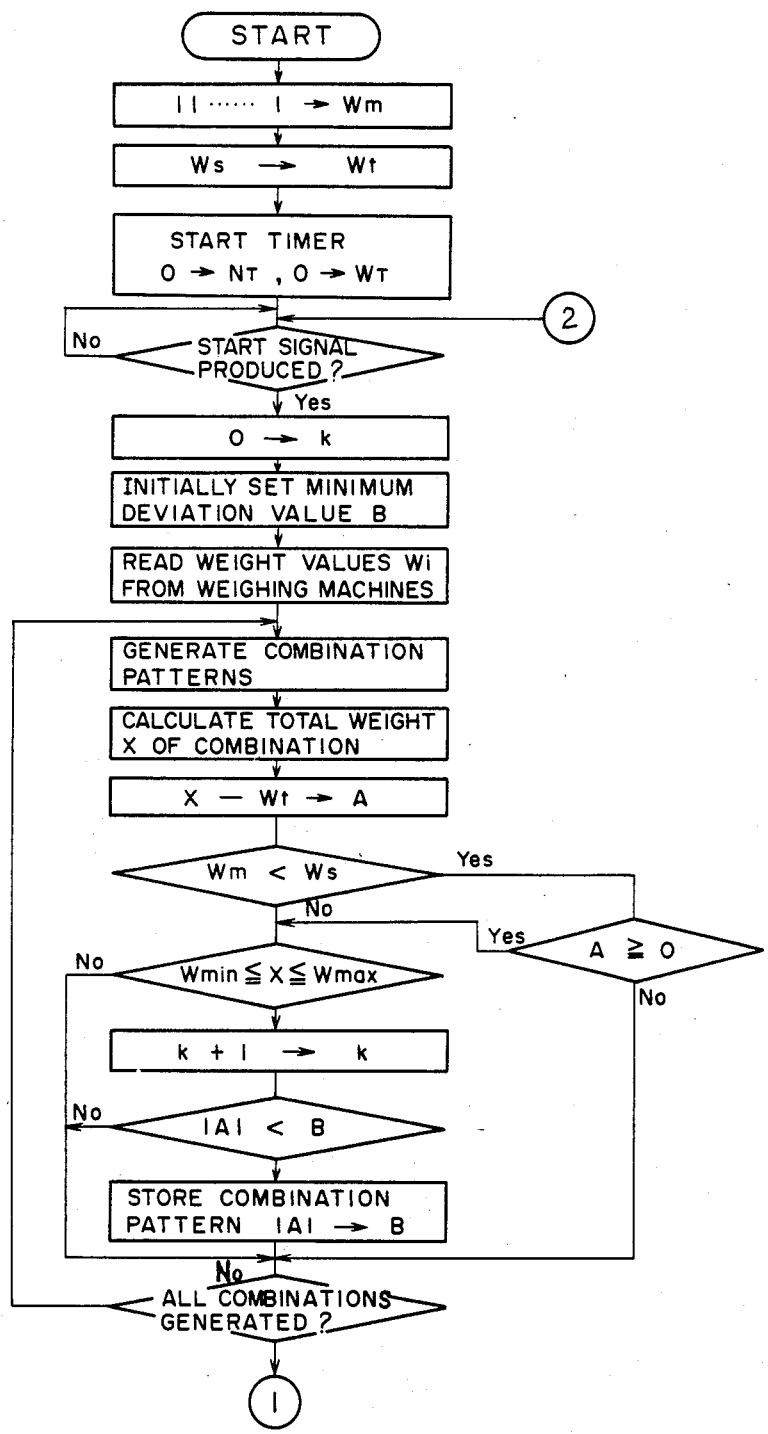
FIGS. 5(A), (B) are flowcharts for the processing associated with the combinatorial weighing method and apparatus of the present invention.
Figure 5:
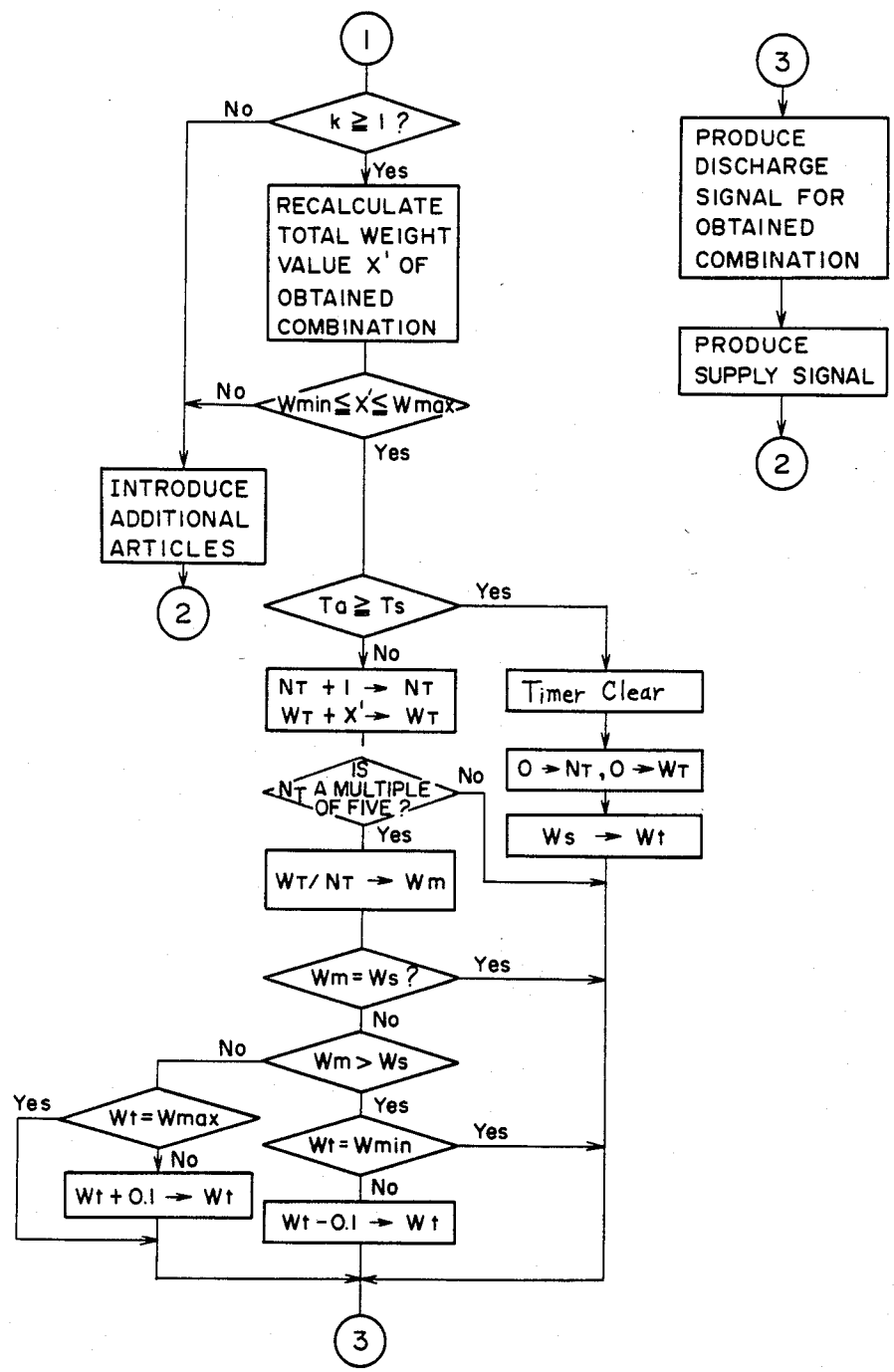

The weighing operation performed by the combinatorial weighing apparatus shown in FIG. 4 will now be described in conjunction with the flowcharts of FIGS. 5(A) and (B). We will assume that starting the weighing operation sets the mean weight value $W_m$ to a predetermined value (a binary number of all "1"s), sets a target weight value $W_t$ equal to the preset weight value $W_s$, starts the timer 104e upon first clearing the timer to zero, and that the operations $0 \rightarrow N_T$, $0 \rightarrow W_T$ are performed.

(a) When a packaging machine (not shown) generates a start signal (timing signal) STS, the signal is read by the processor 104a. Upon detecting the generation of the start signal STS, the processor 104a (1) sets to zero a numerical value k stored in the data memory 104b, and (2) initially sets a minimum deviation value B to a predetermined number (a binary number of all "1"s).

(b) Next, the processor 104a delivers the weight value read signal WRS to the multiplexer 102. The latter responds by successively applying the weight values Wi (i=1, 2 . . . n) to the AD converter 103, which proceeds to convert each weight value Wi into a digital quantity that the processor 104a stores in the data memory 104b.

(c) Thereafter, the processor 104a generates $2^n - 1$ combination patterns, one after another, under the control of the combinatorial processing program. The $2^n - 1$ combination patterns are generated in the following manner. Specifically, the processor 104a has an internal general-purpose register 104d. Correspondence is established between the first bit of the register 104a and the first weighing machine (weight value W1), the second bit and the second weighing machine (W2), and so on through the n-th bit, which corresponds to the n-th weighing machine (weight value Wn). Then, when the general-purpose register 104d has been counted up from 1 to $2^n - 1$, the result will be the generation of $2^n - 1$ combination patterns 0000 . . . 001 through 1111 . . . 111.

The processor 104a is adapted to add the weight values corresponding to the "1" bits in each of the combination patterns to calculate the total weight value X ($= \Sigma Wi$) of each and every combination. Accordingly, in response to generation of the first combination pattern 0000 ... 001, the processor 104a calculates X (=W1) and stores this value in the data memory 104b.

(d) The processor 104a then finds the difference A between the total weight value X and the target weight value $W_t$ by performing the following operation:

$$|X - W_t| \rightarrow A \tag{1}$$

(e) Upon calculating the difference A, the processor 104a renders a decision concerning the magnitude of the mean weight value $W_m$ (initially all "1"s, i.e., 11 ... 1) and the magnitude of the preset weight value $W_s$. Since $W_m$ is initially equal to 11 ... 1, the decision rendered is $W_m > W_s$.

(f) If $W_m > W_s$ is found to hold, the processor 104a determines whether the total weight X of the combination falls within certain limits, that is, whether the following relation holds:

$$W_{min} \leq x \leq W_{max} \tag{2}$$

If Eq. (2) is satisfied, then k is updated through the following operation:

$$k + 1 \rightarrow k \tag{3}$$

(g) The processor 104a then compares the magnitude of the difference $|A|$ and of a minimum deviation value B, which is stored in the data memory 104. If $|A| < B$ is found to hold, the difference $|A|$ is made equal to the minimum deviation value B, i.e., the operation $|A| \rightarrow B$ is performed, and the bit pattern 000 ... 001 is stored in the data memory 104b as a combination pattern which, up to the present point in time, is the optimum combination. Note that $|A| < B$ will hold initially due to the fact that the initial value of B is the binary number 11 ... 1 consisting of all "1"s.

(h) Thereafter, or where X does not satisfy Eq. (2), or where $|A| \geq B$ holds, the processor 104a determines whether all possible combination patterns have been generated. Where this is not the case, the general-purpose register 104d is incremented and the next combination pattern is generated.

(i) From this point onward, the foregoing processing is repeated until all combination patterns are generated, thereby ending combinatorial processing. When this is accomplished, the processor 104a determines whether the following holds:

$$k \geq 1 \tag{4}$$

If it does not, then the processor causes the display unit 108 to present an alarm indication, which signifies failure to obtain a combination the total weight value of which is within the preset allowable limits. Note that if k=0 holds, the processor 104a compares the magnitudes of the weight values $W_1, W_2, \ldots W_{10}$, which are produced by the respective weighing machines and stored in the data memory 104, with the magnitude of a value given by, e.g., $W_s/8$, and produces an enable signal to open the pool hoppers corresponding to those weighing machines that produce weight values which are less than the value $W_s/8$. In this way these weighing machines are supplied with additional articles. Processing then returns to step (a).

(j) If $k \geq 1$ is found to hold in step (i), the processor 104a again enters the weight values $W_i$ and adds weight values $W_i'$ corresponding to the "1" bits in the above-mentioned optimum combination pattern stored in the data memory 104b, thereby calculating the total weight value X' of this combination. When the total weight value X' of the combination has been calculated, the processor determines whether X' falls within the range given by:

$$W_{min} \leq X' \leq W_{max} \tag{5}$$

In other words, the processor 104a again determines whether X' lies within the preset allowable limits. Note that a combination of articles having a total weight outside the present allowable limits is prevented, by virtue of step (j), from being discharged even if the weight values $W_1$ through $W_{10}$ used in steps (a) through (i) contain an error attributable to the effects of external vibration or the like.

(k) If Eq. (5) is not satisfied, the processor 104a executes processing similar to that executed in step (i) for the case where k=0 was found to hold.

(l) If Eq. (5) is satisfied, then the processor 104a determines whether a time $T_a$ measured by the timer 104e (FIG. 4) has attained a preset time $T_s$ (e.g., 30 sec or 1 hr).

(m) If $T_a < T_s$ is found to hold, then the processor 104a performs the following operations:

$$N_T + 1 \rightarrow N_T \tag{6}$$

$$W_T + X' \rightarrow W_T \tag{7}$$

to update $N_T$, which is the total number of times articles have been discharged, and $W_T$, which is the running total weight of articles discharged.

(n) Thereafter, the processor 104a determines whether $N_T$ has attained a prescribed numerical value, e.g., a factor of five. If it has, then the processor 104a calculates the mean weight value $W_m$. In other words, the mean weight value $W_m$ is calculated every five discharge cycles.

(p) If $N_T$ is not a multiple of five, then the processor 104a delivers the obtained optimum combination pattern to the discharge control unit 109, which responds by controlling the hopper drive units 15 in such a manner that the weighing hoppers 13 of the weighing machines 101 corresponding to the "1" bits in the optimum combination pattern, discharge their articles. the processor 104a then controls the hopper drive units 15 in such a manner that these units cause the weighing hoppers 13 of the weighing machines which have discharged their articles to be resupplied by the overlying pool hoppers 12, after which the system awaits a start signal from the packaging machine.

(q) If $N_T$ is a multiple of five, the processor 104a calculates the mean weight value $W_m$ by performing the following operation:

$$W_T / N_T \rightarrow W_m \tag{8}$$

(r) Thereafter, the processor 104a determines whether the mean weight value $W_m$ and the preset weight value $W_s$ are equal. If $W_m = W_s$ holds, the target weight Wt is not updated and step (p) is performed to discharge the articles corresponding to the optimum combination and supply the corresponding weighing machines 101 with articles from the overlying pool hopper 12. The system then awaits a start signal from the packaging machine.

(s) If the mean weight value $W_m$ and the preset weight value Ws are not equal, the processor 104a, through subsequent processing which is dependent upon the magnitude of these values, updates the target weight value $W_t$ in such a manner that the mean weight value approaches the preset weight value. More specifically, when $W_m > W_s$ holds, the target weight value $W_t$ is diminished so as to reduce the size of the mean weight value. However, since the minimum value of the target weight Wt is the lower limit value $W_{min}$ of the preset allowable limits, the processor 104a first determines whether $W_t = W_{min}$ holds. When the condition $W_t = W_{min}$ does hold, the processor clamps the target weight value $W_t$ to $W_{min}$ and executes the discharge and supply operations of step (p), with the system then being placed in the mode awaiting the start signal from the packaging machine. If $W_t = W_{min}$ does not hold, on the other hand, that is, if $W_t > W_{min}$ holds, then the processor 104a diminishes the target weight value $W_t$ by a predetermined amount, say 0.1 g, and executes the discharge and supply operations of step (p), with the system then being placed in the mode awaiting the start signal from the packaging machine.

(t) If the condition $W_m < W_s$ is found to hold when the average weight value $W_m$ and preset weight value $W_s$ are unequal, the processor 104a enlarges the target weight value $W_t$ so as to increase the mean weight value. However, since the maximum value of the target weight Wt is the upper limit value $W_{max}$ of the preset allowable limits, the processor 104a first determines whether $W_t = W_{max}$ holds. When the condition $W_t = W_{max}$ does hold, the processor clamps the target weight value $W_t$ to $W_{max}$ and executes the discharge and supply operations of step (p), with the system then being placed in the mode awaiting the start signal from the packaging machine. If $W_t = W_{max}$ does not hold, on the other hand, that is, if $W_t < W_{max}$ holds, then the processor 104a enlarges the target weight value $W_t$ by a predetermined amount, say 0.1 g, and executes the discharge and supply operations of step (p), with the system then being placed in the mode awaiting the start signal from the packaging machine.

(u) If the mean weight value $W_m$ is found to be less than the preset weight value $W_s$ in the decision step (e), the processor 104a determines whether the difference A obtained in step (d) is equal to or greater than zero. In other words, the processor determines whether the total weight value X of a combination is equal to or greater than the target weight value $W_t$. If $X \geq W_t$ ($A \geq 0$) is found to hold, step (f) is executed; if $X < W_t$ ($A < 0$) holds, step (h) is executed. Thus, according to the present invention, when $W_m < W_s$ is found to hold, so-called minus-cut combinatorial processing is executed, namely processing wherein the lower limit value is used as the target weight value $W_t$. This is helpful in bringing the mean weight value $W_m$ close to the set weight value $W_s$.

(v) When the time $T_a$ is found to be equal or greater than the preset time $T_s$ is step (l), the timer 104e is cleared to zero and then restarted by the processor 104a. The processor also executes the initialization process steps $0 \rightarrow N_T$, $0 \rightarrow W_T$, $W_sW_t$ and then executes the discharge and supply control operations of step (p), after which the start signal STS from the packaging machine is awaited.

In the foregoing description, it was assumed that the mean weight value initially has a binary value of all "1"s. However, all "0"s can be used as the initial value, in which case $W_m < W_s$ would initially hold in step (e), followed by execution of step (u).

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method carried out under the control of a control unit for performing combinatorial computations based on weight values produced as outputs by respective ones of a plurality of weighing machines which measure the weights of articles supplied thereto, the control unit selecting a combination of weighing machines whose articles have a total combined weight value within preset allowable limits, and discharging the articles from the weighing machines belonging to the selected combination, said method comprising the steps of:
    (a) calculating a mean wieght value for the total combined weight values selected during a plurality of weighing cycles;
    (b) setting a target weight value, which serves as the target for the combinatorial computations performed by the control unit, so that the mean weight value approaches a preset weight value which is within the preset allowable limits; and
    (c) performing combinatorial computation while diminishing the target weight value by a predetermined amount when the mean weight value is greater than the preset weight value, and increasing the target weight value by a predetermined amount when the mean weight value is less the preset weight value.

2. The method according to claim 1, further comprising the step of setting the initial value of the target weight value to be equal to the preset weight value.

3. The method according to claim 2, further comprising the step of selecting a combination of weighing machines whose articles have a total combined weight value closest to the target weight value within the preset allowable limits when the mean weight value is greater than the preset weight value.

4. The method according to claim 2, further comprising the step of selecting a combination of weighing machines whose articles have a total combined weight value closest to but not less than the target weight value when the mean value is less than the preset weight value.

5. The method according to claim 2, wherein said step (a) comprises calculating the mean weight value whenever articles are discharged a predetermined number of times.

6. The method according to claim 5, wherein said step (a) further comprises:
    calculating the mean weight value by dividing a sum of the total combined weight values of discharged articles by a discharge number corresponding to the number of times articles are discharged; and
    clearing the sum and the discharge number to zero at predetermined intervals.

7. The method according to claim 1, further comprising the step of selecting a combination of weighing machines whose articles have a total combined weight value closest to the target weight value within the preset allowable limits when the means weight value is greater than the preset weight value.

8. The method according to claim 1, further comprising the step of a selecting a combination of weighing machines whose articles have a total combined weight value closest to but not less than the target weight value when the mean weight value is less than the preset weight value.

9. The method according to claim 1, wherein said step (a) comprises calculating the mean weight value whenever articles are discharged a predetermined number of times.

10. The method according to claim 9, wherein said step (a) further comprises:
calculating the mean weight value by dividing a sum of the total combined weight values of discharged articles by a discharge number corresponding to the nurber of times articles are discharged; and
clearing the sum and the discharge number to zero at predetermined intervals.

11. A combinatorial weighing apparatus having a plurality of weighing machines for measuring the weights of articles supplied thereto and for outputting respective weight values used for performing combinatorial computations to select a combination of weighing machines whose articles have a total combined weight value within preset allowable limits, and to discharge the articles from the weighing machines belonging to the selected combination, said apparatus comprising:
means for calculating a mean weight value for the total combined weight values selected during a plurality of weighing cycles;
means for setting a target weight value, which serves as the target for the combinatorial computations, so that the mean weight value approaches a preset weight value which is within the preset limits; and
means for performing combinatorial computation while diminishing the target weight value by a predetermined amount when the mean weight value is greater than the preset weight value, and incresing the target weight value by a predetermined amount when the mean wieght value is less than the preset weight value.

12. The apparatus according to claim 11, further comprising means for selecting a combination of the weighing machines whose articles have a total combined weight value closest to the target weight value within the preset allowable limits when the mean weight value is greater than the preset weight value.

13. The apparatus according to claim 11, further comprising means for selecting a combination of the weighing machines whose articles have a total combined weight value closest to but not less than the target weight value when the means weight value is less than the preset weight value.

14. The apparatus according to claim 11, wherein said calculating means comprises means for calculating the mean weight value whenever articles are discharged a predetermined number of times.

15. The apparatus according to claim 14, wherein said calculating means further comprises:
means for obtaining the mean weight value by dividing a sum of the total combined weight values of discharged articles by a discharge number corresponding to the number of times articles are discharged; and
means for clearing the sum and the discharge number to zero at predetermined intervals.

16. A combinatorial measuring method comprising the steps of:
(a) determining, during a weighing cycle, the weights of a plurality of batches of articles, and providing weight values corresponding to the respective weights of the batches of articles;
(b) performing, during a weighing cycle, combinatorial computation based on the weight values provided in said step (a) to select the combination of batches having a total combined weight value which is closest to a target weight value within preset allowable limits;
(c) selectively calculating a means weight value for the total combined weight values corresponding to the combinations selected in said step (b) during a plurality of weighing cycles;
(d) adjusting the target weight value so that the mean weight value approaches a preset weight value which is within the preset allowable limits, said adjusting step comprising the substeps of:
(i) diminishing the target weight value by a predetermined amount when the mean weight value is greater than the preset weight value; and
(ii) increasing the target weight value by the predetermined amount when the mean weight value is less than the preset weight value.

17. The method according to claim 16, wherein said step (b) comprises the step of selecting the combination of batches of articles having a total combined weight value closest to but not less than the target weight value when the mean weight value is less than the preset weight value.

18. The method according to claim 16, wherein said step (b) comprises selecting the combination of batches of articles having a total combined weight value closest to the target weight value within the preset allowable limits when the sean weight value is greater than the preset weight value.

19. The method according to claim 16, wherein said step (c) comprises calculating the mean weight value after a predetermined number of weighing cycles have occurred.

20. The method according to claim 19, wherein said step (c) further comprises:
calculating the mean weight value by dividing a sum of the total combined weight values of discharged articles by a discharge number corresponding to the number of weighing cycles; and
clearing the sum and the discharge number to zero at predetermined intervals.

* * * * *